United States Patent
Schlapp et al.

[11] 3,722,390
[45] Mar. 27, 1973

[54] EXTENSION TUBE FOR PHOTOGRAPHIC LENSES

[75] Inventors: Werner Schlapp, Asslar; Otto Boss, Naunheim, both of Germany

[73] Assignee: Ernst Leitz GmbH, Wetzlar, Germany

[22] Filed: Feb. 15, 1972

[21] Appl. No.: 226,467

[30] Foreign Application Priority Data

Feb. 25, 1971 Germany.....................P 71 70 072.9

[52] U.S. Cl..............................95/45, 95/42, 95/64 B
[51] Int. Cl.................................................G03b 3/00
[58] Field of Search........95/42, 45, 64 B, 64 R, 64 C

[56] References Cited

UNITED STATES PATENTS

| | | | |
|---|---|---|---|
| 2,948,206 | 8/1960 | Swarofsky | 95/64 B |
| 2,969,008 | 1/1961 | Ferrari et al. | 95/64 B |
| 3,489,071 | 1/1970 | Mohr et al. | 95/45 |
| 3,675,550 | 7/1972 | Ishiyaka | 95/42 |

Primary Examiner—John M. Horan
Assistant Examiner—E. M. Bero
Attorney—Kraft & Wells

[57] ABSTRACT

An extension tube for a photographic lens having a diaphragm preselection ring and a diaphragm blade ring resiliently urged into the position of the smallest diaphragm aperture. The tube is provided with a preselection ring and with an inner ring of its own. Interengaging means on the lens and on the extension tube keep the lens preselection ring arrested in its position of the smallest diaphragm aperture when the lens is mounted on the extension tube. The extension tube inner ring is provided with a first stud on its front and with a second stud on its rear, both studs extending in axial direction. The front stud engages the lens diaphragm blade ring and the rear stud engages the camera diaphragm lever so that the action of the camera diaphragm lever is transmitted through the extension tube to the lens diaphragm blade ring and the diaphragm preselection operation of the lens is maintained when the extension tube is inserted between the lens and the camera body.

3 Claims, 2 Drawing Figures

3,722,390

3,722,390

EXTENSION TUBE FOR PHOTOGRAPHIC LENSES

BACKGROUND OF THE INVENTION

The invention relates to extension tubes for lenses. More specifically the invention relates to extension tubes for bayonet-coupled photographic lenses for SLR cameras comprising a diaphragm preselection ring and a diaphragm blade ring which is urged by spring means into the position of the smallest diaphragm aperture.

Extension tubes for photographic lenses are well known to those skilled in the art. Usually they are used to extend the reproduction scale of the objective. Without employing an extension tube photographic lenses may have a reproduction scale of 1:2. With an extension tube inserted between the lens and the camera body this reproduction scale may be extended to a ratio of 1:1.

This goes for both, range finder cameras and SLR cameras. However, with SLR cameras usually lenses are used featuring diaphragm preselection and which consequently comprise a diaphragm preselection ring and a separate diaphragm blade ring which is operated by a lever arm connected to the reflex mirror as, for example, disclosed in the U.S. Pat. No. 3,083,627. But if an extension tube is mounted between the camera body and the lens the lever arm cannot further engage the diaphragm blade ring. As a consequence, the diaphragm preselection device is rendered inoperative.

It is therefore a specific object of the present invention to provide an extension tube for SLR cameras and lenses with diaphragm preselection by which the preselection operation of the lens is maintained when the tube is employed.

SUMMARY OF THE INVENTION

The above stated object is attained by providing the extension tube with its own preselection device, i.e. with a preselection ring and an inner ring which has about the same function as the diaphragm blade ring in the lens, except that this inner ring does not operate any blades. Instead the inner ring has on its front and on its rear a stud each of which the front stud is in abutting contact with a pin in the lens diaphragm ring while the rear stud is engaged by the lever arm in the camera body.

The inner ring could therefore also be described as a ring member which only bridges the distance between the camera body lever arm and the pin on the diaphragm blade ring. In the same manner as the diaphragm blade ring in the lens, the inner ring is under the influence of a spring which tends to pull the ring in a position corresponding to the smallest diaphragm aperture. During its rotation the inner ring abuts against a lug on the preselection ring of the extension tube so that the preselection ring and the inner ring can be used for presetting a desired f-stop number in the same way as the preselection ring on the lens is used when no extension tube is inserted.

Before this operation can be performed the lug on the lens preselection ring must be brought out of the way of the lens diaphragm blade ring so that the latter may freely rotate to the selected position which is now determined by the extension tube preselection ring. Therefore, before the lens is coupled to the extension tube, care must be taken that the lens preselection ring is rotated into the position which corresponds to the smallest preselected diaphragm aperture.

In order to ensure that the operator always rotates the lens preselection ring as described above prior to mounting the lens, means are provided on the lens and on the extension tube which prevent any mounting of the lens unless the lens preselection ring is positioned accordingly. These means comprise a lug on the rear surface of the lens preselection ring and a groove on the front surface of the extension tube. The lug and the groove are so positioned that — taking into account the angular movement of the lens when mounting the latter in the bayonet-coupling — the lens only fits into the extension tube when the lens preselection ring is in the smallest diaphragm aperture position.

Since the lens preselection ring is then rendered inoperative its existence and the sight of the f-stop scale thereon may confuse the operator. To prevent such confusion it is regarded best to hide the whole ring from view by covering it up. It is, therefore, further suggested to provide an annular shoulder on the front of the extension tube which extends over the lens preselection ring and not only hides it from view but also makes it impossible for the operator to touch it and fumble on it, as soon as the lens is properly inserted in the extension tube.

BRIEF DESCRIPTION OF THE DRAWINGS

The invention will be more readily comprehended from the following description when taken in conjunction with the appending drawings, wherein.

DESCRIPTION OF THE PREFERRED EMBODIMENT

Figure 1:
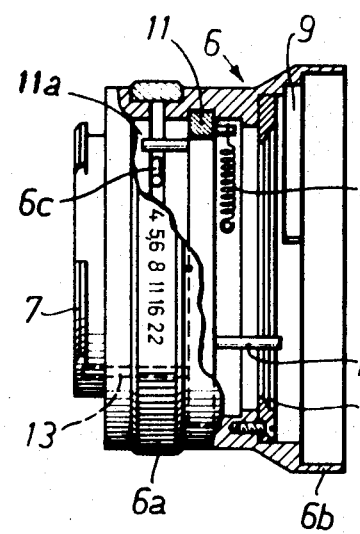
FIG. 1 is a partially sectional view of the extension tube.
Figure 2:
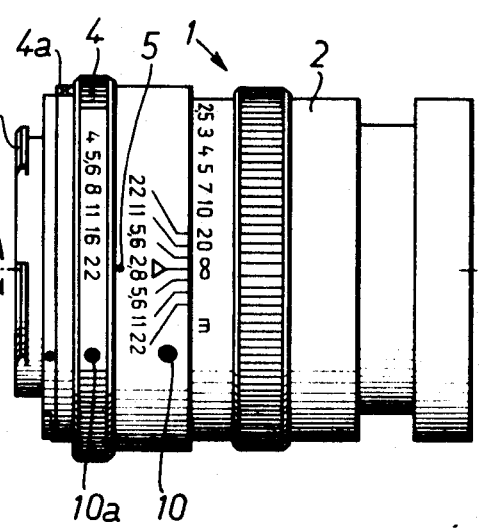
FIG. 2 is a view of the lens to be mounted in the tube.

Referring now to the drawings, the lens 1 comprises mainly a lens mount 2 having a bayonet ring 3 at its rear, which is the left-hand side in the drawing. Further, it comprises a lens preselection ring 4 provided with an f-stop scale which may be positioned with reference to an index 5 on the mount 2. On its inside the preselection ring is provided with a lug and the lens has a diaphragm blade ring which is rotatable and abuts against a lug of the preselection ring. The lug and the diaphragm blade ring are of conventional design and therefore not shown for sake of simplicity. FIG. 1 shows the invented extension tube 6 comprising an outer tubular body with a bayonet socket 8 to which the lens may be coupled, and with a positive bayonet ring 7 by means of which the extension tube may be inserted into the camera body (not shown).

The body of the tube 6 is also provided with a preselection ring which is referred to as the extension tube preselection ring 6a in order to distinguish from the lens preselection ring 4. On its inner side the ring 6a has a stop member 6c which extends through a slot 10 into the interior of the extension tube.

On the inside of the tube 6 there is an inner ring 11 rotatable. The ring 11 is provided with an abutting pin 11a by means of which the ring abuts against the stop member 6c in whatever position the ring 6a happens to be. In a known manner the inner ring 11 is urged against the stop member 6c by a suitable tension spring 12 which is suspended between the tube body and the ring.

Further, the ring 11 has two lugs 13 and 14, one extending from the front surface and the other one from the rear surface. The rear lug 13 is so designed as to be engaged by a lever arm connected to the reflex mirror of the camera as, for example, shown in the FIGS. 4 and 6 of the U.S. Pat. No. 3,083,627. The front lug 14 engages a pin extending in axial backward direction from the diaphragm blade ring of the lens 1 (not shown for sake of simplicity, but also disclosed in the above mentioned U.S. patent).

The way of operation of the invented extension tube is as follows:

First let it be assumed that the tube is mounted with its bayonet ring 7 in the bayonet socket of the camera body. To this end, the tube is first placed into the mother bayonet. This brings the rear lug 13 in a position under the lever arm in the camera body. When the tube is subsequently rotated through a certain angle the rear lug is kept in its position by a stationary lever arm.

Thereafter, the lens 1 is coupled into the bayonet socket 8 of the extension tube. This can only be accomplished if prior thereto the lens preselection ring 4 has been turned to the position of the smallest f-stop value. The ring 4 has a pin 4a projecting from its rear surface which matches with a groove 9 in the front surface of the extension tube body. Thereby any mounting of the lens in the extension tube without the preselection ring first being set to the smallest diaphragm is prevented. This is necessary in order to allow the diaphragm blade ring in the lens 1 to rotate freely through its full angle of rotation, i.e. from the largest to the smallest aperture. Thus, for any following diaphragm preselection operation the lens diaphragm ring 4 is rendered completely inactive.

Since under this condition the ring 4 is no more to be operated it is considered advantageous to cover the ring, so that the operator will not be confused by the scale or otherwise be tempted to fumble with the ring. The extension tube body is, therefore, provided with an annular shoulder 6b which extends over the preselection ring 4 and covers it completely when the lens 1 is properly mounted in the tube; thus keeping the ring out of sight.

When the lens 1 is actually mounted in the extension tube the pin extending to the rear from the lens diaphragm blade ring extends underneath the front lug 14 in the same way as the rear lug extends under the lever arm in the camera body. Upon rotation of the lens in the bayonet socket 8 the lens diaphragm blade ring is retained in the position of the largest aperture.

Preselection of the working aperture is done by means of the extension tube preselection ring 6a. The latter is set to the desired f-stop number which causes the stop member 6c to move to a corresponding position. When now, upon shutter release, in the camera body the reflex mirror swings upward, thereby withdrawing the lever arm, the rear lug 13 is released so that the inner ring 11 will rotate and will abut with its abutting pin 11a against the stop member 6c under the force of the tension spring 12.

Thereby the front lug 14 is also rotated, releasing in turn the diaphragm blade ring in the lens 1. The diaphragm blade ring follows the lug 14 and is stopped whenever the inner ring 11 is stopped by the stop member 6c.

It can thus be seen that the diaphragm preselection function of the lens is preserved, even though an extension ring is inserted between the lens and the camera body.

What is claimed is:

1. An extension tube for photographic lenses with a diaphragm preselection ring and a spring loaded rotatable lens diaphragm blade ring which is resiliently urged against an abutting surface projecting from the preselection ring, and with a bayonet ring for coupling the lenses to SLR camera bodies which include a diaphragm lever arm, the extension tube comprising:
   a. a tube body;
   b. bayonet socket (8) on the front surface of the tube body for coupling the lens to the extension tube and a positive bayonet ring (7) on the rear surface for coupling the extension tube to the camera body;
   c. a diaphragm preselection ring (6a) rotatable on the tube body and being provided with a scale of f-stop numbers on its outer surface to anyone of which the preselection ring may be set relative to an index mark on the tube body, said preselection ring also being provided with a stop member (6c) projecting from its inner surface;
   d. an inner ring (11) rotatable within the tube body and being provided with a first lug extending in axial direction to the front (14) and with a second lug extending in axial direction to the rear (13), the first lug engaging the lens diaphragm blade ring when the photographic lens is mounted in the extension tube and the second lug engaging the diaphragm lever arm when the extension tube is mounted to the camera body; and
   e. spring means (12) urging the inner ring in an abutting contact with the stop member of the preselection ring so that the inner ring will be rotated against the stop member upon withdrawal of the diaphragm lever arm from engagement with the second lug, thereby also rotating the first lug so that the lens diaphragm blade ring can follow this first lug under its own spring load.

2. An extension tube as claimed in claim 1, and further comprising a groove (9) in the front surface of the tube body for accepting a pin (4a) of the lens preselection ring, the groove being so positioned on the circumference of the front surface that the lens can only be properly mounted in the extension tube when the lens preselection ring has been set to a position which corresponds to the smallest diaphragm aperture.

3. An extension tube as claimed in claim 1, and further comprising an annular shoulder (6b) projecting from the outer circumference of the front surface of the extension tube in forward direction for covering the lens preselection ring along all of its circumference when the lens is mounted in the extension tube.

* * * * *